(12) United States Patent
Mangaser et al.

(10) Patent No.: US 8,553,754 B2
(45) Date of Patent: Oct. 8, 2013

(54) METHOD AND APPARATUS FOR USING DFE IN A SYSTEM WITH NON-CONTINUOUS DATA

(75) Inventors: Ramon Mangaser, Boston, MA (US); Shefali Walia, Waltham, MA (US); Edoardo Prete, Arlington, MA (US); Jonathan P. Dowling, Austin, TX (US); Gerald R. Talbot, Concord, MA (US); Sharad N. Vittal, Acton, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 473 days.

(21) Appl. No.: 12/973,242

(22) Filed: Dec. 20, 2010

(65) Prior Publication Data
US 2012/0155529 A1    Jun. 21, 2012

(51) Int. Cl.
*H03K 5/159* (2006.01)
*H03H 7/30* (2006.01)
*H03H 7/40* (2006.01)

(52) U.S. Cl.
USPC ............................. 375/233; 375/229; 375/316

(58) Field of Classification Search
USPC .......................................... 375/229, 233, 316
See application file for complete search history.

(56) References Cited

U.S. PATENT DOCUMENTS

| | | | | |
|---|---|---|---|---|
| 7,697,649 | B2 * | 4/2010 | Okamura | 375/355 |
| 2004/0264615 | A1 * | 12/2004 | Ho et al. | 375/355 |
| 2005/0259726 | A1 * | 11/2005 | Farjad-rad | 375/232 |
| 2012/0314756 | A1 * | 12/2012 | Leibowitz et al. | 375/233 |

* cited by examiner

*Primary Examiner* — Ted Wang
(74) *Attorney, Agent, or Firm* — Volpe and Koenig, P.C.

(57) ABSTRACT

A decision feedback equalization (DFE) receiver and method are provided. The DFE receiver is configured to sample data bits from a data bus. The DFE receiver includes a data sampler configured to sample a current data bit from the data bus using one of a first, second and third voltage reference. The DFE receiver also includes multiplexing logic configured to select one of the first, second and third voltage references based on a prior data bus level. The wherein the first voltage reference is selected if the prior data bus level was a logic zero. The second voltage reference is selected if the prior data bus level was a logic one. The third voltage reference is selected if the prior data bus level was tri-state.

27 Claims, 8 Drawing Sheets

METHOD AND APPARATUS FOR USING DFE IN A SYSTEM WITH NON-CONTINUOUS DATA

FIELD OF INVENTION

This invention relates to memory subsystems that interface with memory devices using decision feedback equalization.

BACKGROUND

Typical memory systems use either an asynchronous or synchronous clocking scheme to transmit data between the memory controller and the memory device. Synchronous clocking means that the memory device waits for a clock signal before responding to control inputs and is therefore synchronized with the computer's system bus. Synchronous dynamic random access memory (SDRAM) is widely used since such devices typically support higher clock speeds than asynchronous memory devices.

Double data rate (DDR) SDRAM transfers data on both the rising and falling edges of the clock signal. Such memory devices use a lower clock frequency but require strict control of the timing of the electrical data and clock signals. The first version of such devices (DDR1) achieved nearly twice the bandwidth of a single data rate (SDR) SDRAM running at the same clock frequency. DDR2 and DDR3 SDRAM devices are subsequent improvements over DDR1 devices. Regardless of which type of memory is used, a physical interface (Phy) is coupled directly between the memory controller and the memory devices. The Phy interface generally includes circuitry for handling the timing requirements of the data, command, address and associated strobes. For example, Phy may include delay circuitry configured to properly locate the data strobe in the data eye.

Data transferred between memory and a processor, or vice versa, over real channels (wires/transmission lines) severely degrades the receive data eye. In particular the channel characteristics introduces moderate to severe ISI (Inter Symbol Interference) for multi-gigabit ranges. The use of decision feedback equalization (DFE) may help in properly receiving these degraded eyes. However, current designs are not optimized to receive data just after the read preamble.

SUMMARY OF EMBODIMENTS

A decision feedback equalization (DFE) receiver and method are provided. The DFE receiver is configured to sample data bits from a data bus. The DFE receiver includes a data sampler configured to sample a current data bit from the data bus using one of a first, second and third voltage reference. The DFE receiver also includes multiplexing logic configured to select one of the first, second and third voltage references based on a prior data bus level. The wherein the first voltage reference is selected if the prior data bus level was a logic zero. The second voltage reference is selected if the prior data bus level was a logic one. The third voltage reference is selected if the prior data bus level was tri-state.

The DFE receiver may also include a first programmable location configured to store a first threshold value associated with the first threshold voltage, a second programmable location configured to store a second threshold value associated with the second threshold voltage and a third programmable location configured to store a third threshold value associated with the third threshold voltage. The DFE receiver may also include a first threshold voltage generator configured to generate the first threshold voltage based on the first threshold value, a second threshold voltage generator configured generate the second threshold voltage based on the second threshold value, and a third threshold voltage generator configured generate the third threshold voltage based on the third threshold value.

The multiplexing logic may include an enable input configured to receive a tri-state enable indication configured to indicate that the data bus was previously in a tri-state condition. The data sampler may include a first amplifier configured to sample data using the first threshold, a second amplifier configured to sample data using the second threshold voltage and a third amplifier configured to sample data using the third threshold voltage. The data sampler may also include a flip flop having a sense amplifier input configured to selectively latch data output from the first, second and third amplifiers. The multiplexing logic may be configured to select data output from one of the first, second and third amplifiers.

The DFE receiver may also include a low pass filter configured to filter data bits from a data bus. The low pass filter may include a programmable location configured to store a select input. The low pass filter may be configured with an adjustable cut-off frequency responsive to the select input.

DETAILED DESCRIPTION OF THE EMBODIMENTS

An increase in data rate between a memory device and memory controller and interface circuitry may cause significant problems. An increased data rate typically results in increased distortion in the data channel. As a result, inter-symbol interference (ISI) increases due to an effect where previous data influences the currently transmitted data due to a limit of data channel bandwidth.

Figure 1:
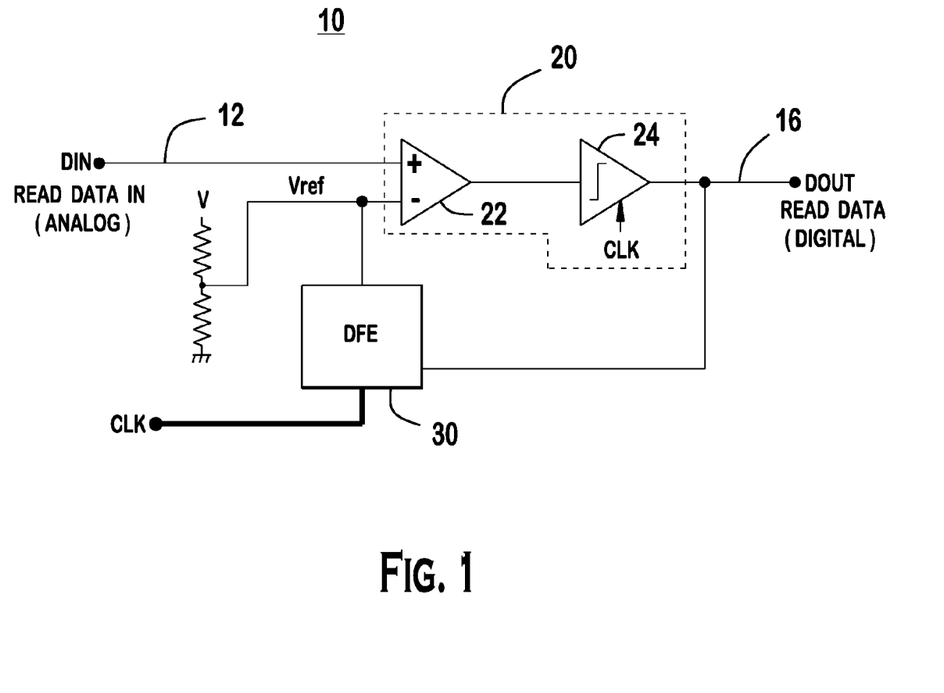
FIG. 1 is a block diagram of a basic receiver.

A decision feedback equalizer (DFE) may be used to reduce ISI. In general, a DFE uses previous data to adjust the reference used during data sampling. FIG. 1 is a block diagram of a basic receiver 10 including data sampler 20 and feedback circuit 30. Read data from an attached memory (not shown) is coupled to the $D_{in}$ input 12. $D_{in}$ is an analog signal and is coupled to the non-inverting input of amplifier 22. A voltage reference ($V_{ref}$) is established at the inverting input of amplifier 22. The output of amplifier 22 (analog) is fed into sense amplifier 24 and the resulting data output 16 ($D_{out}$) is a digital representation of the data bit.

Feedback circuit 30 may be implemented in a variety of configurations. For example, feedback circuit 30 may include a shift register and a resistor network. In operation, as symbols are data output 16 ($D_{out}$) from the data sampler 20 is fed back to the shift register which stores a plurality of prior output data bits. These historical data bits may be used to drive the resistor network and adjust the reference voltage at the non inverting input 14. As each subsequent data bit is received, the prior bits are shifted resulting in a weighting function, (e.g., recent bits are weighted more heavily than older bits). In the alternative, feedback circuit 30 may be implemented with two threshold voltages. A first threshold voltage may be selected if the prior data bit was a zero, a second threshold voltage may be selected if the prior data bit was a one. Such circuitry does not address a scenario where prior data history is unavailable.

In a typical read operation, a read preamble precedes the actual data. This creates a unique situation in the receiver circuitry. During this preamble, the channel is in a tri-state condition. The on-die termination is "on" but driver data has not been received yet at the processor side. This drives the bus to a mid-rail condition. Once the data arrives at a receiver, the signal transitions up or down depending on the bit received. However, DFE circuitry lacks a prior history since the read preamble causes a tri-state condition on the data bus. This may result in read errors until the DFE circuit may establish a reliable bit history.

Figure 2:
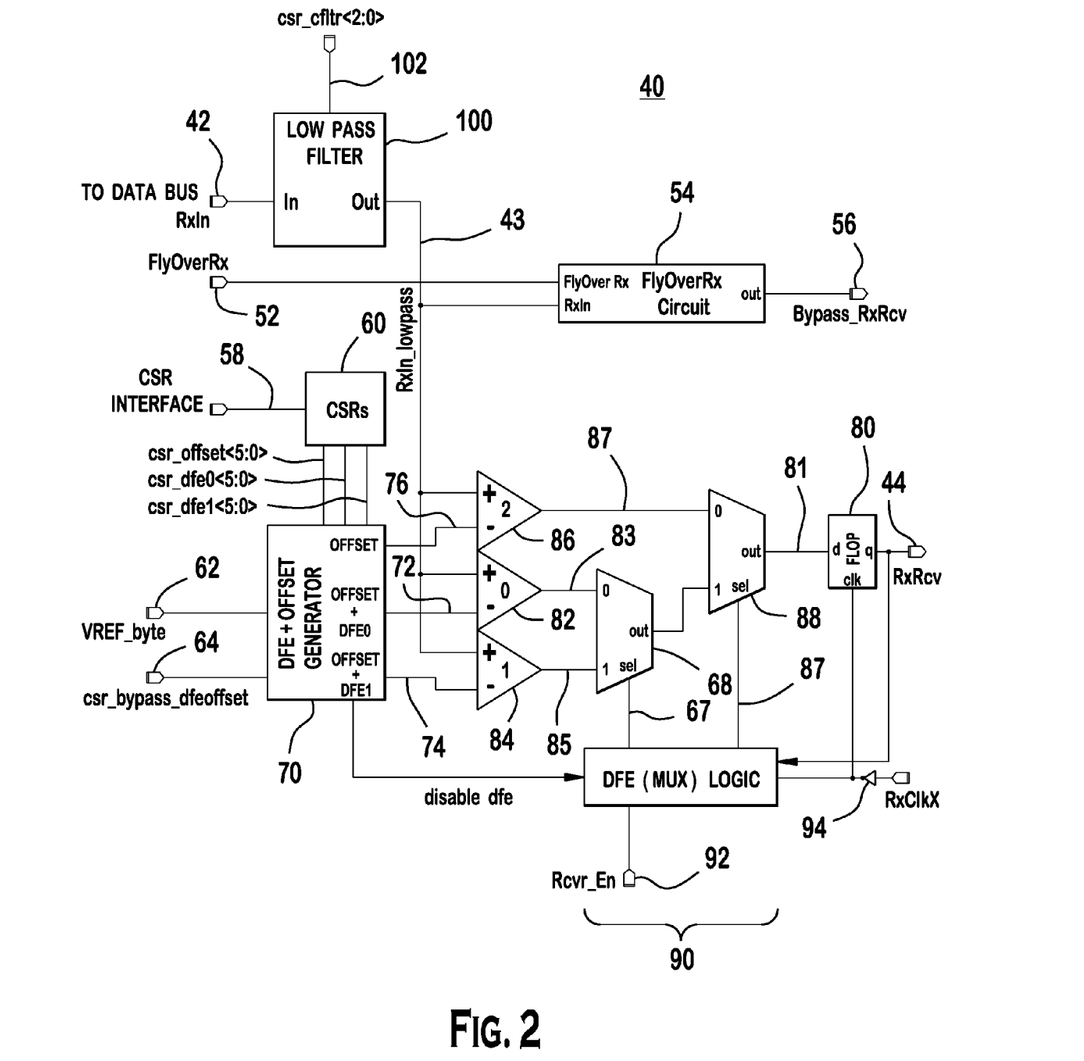
FIG. 2 is a block diagram of a DFE receiver supporting three voltage thresholds.

FIG. 2 shows a DFE receiver 40 that uses a third threshold to optimize for incoming data just after a tri-state condition, (e.g., following the read preamble). This additionally allows the decoupling of the "high" and "low" thresholds (main) for DFE from the threshold used to receive the signal transition just after the preamble. This example shows the circuitry for a single data bit read from a data bus with an attached memory device. It should be understood multiple DFE receivers will be required to support multiple data bits, (e.g., 72 data bits including 8 bits for ECC). The data bus is coupled to the RxIn pin 42. At this point, an incoming data bit is an analog signal. Once the proper threshold is applied, the data is clocked through flip flop 80, (e.g., strong arm or sense amp flip flop), and a digital data bit is output at the RxRcv pin 42. In this example, differential amplifiers 82, 84, 86 and flip flop 80 function as a data sampler. Multiplexing logic 90 is configured to select the proper operational amplifier and therefore the proper threshold voltage based on the logic value of a prior data bit or a tri-state condition.

The DFE receiver 40 also includes a variety of support pins. The FlyOverRx pin 52 is used to select a bypass mode. For example, when FlyOverRx pin 52 is driven with a logical 1 value, the signal from RxIn is passed through the FlyOverRx circuit 54. The Bypass_RxRcv pin 56 may be used instead of the RxRcv pin 42 (the DFE circuitry is bypassed). This pin is typically used in diagnostic operations.

The DFE receiver 40 includes several command and status registers (CSRs) 60 that are configured to store configuration information. In general, the CSRs are accessed via an interface 58 and may store values for several thresholds. In this example, three threshold values are used, csr_dfe0, csr_dfe1 and csr_offset. Based on these threshold values, three threshold voltages 72, 74, 76 are generated via threshold generator unit 70. The first threshold value, csr_dfe0, defines a first threshold voltage associated with a logical 0 and corresponds to the threshold voltage generated at the offset+DFE0 output 72. The second threshold value, csr_dfe1, defines a second threshold voltage associated with a logical 1 and corresponds to the threshold voltage generated at the offset+DFE1 output 74. The third threshold value, csr_offset, defines a third threshold voltage associated with a tri-state condition and corresponds to the threshold voltage generated at the offset output 76. In this example, the threshold values are defined using 6 bits (64 possible values). It is understood that fewer or additional bits may be used depending on the precision desired.

Figure 3:
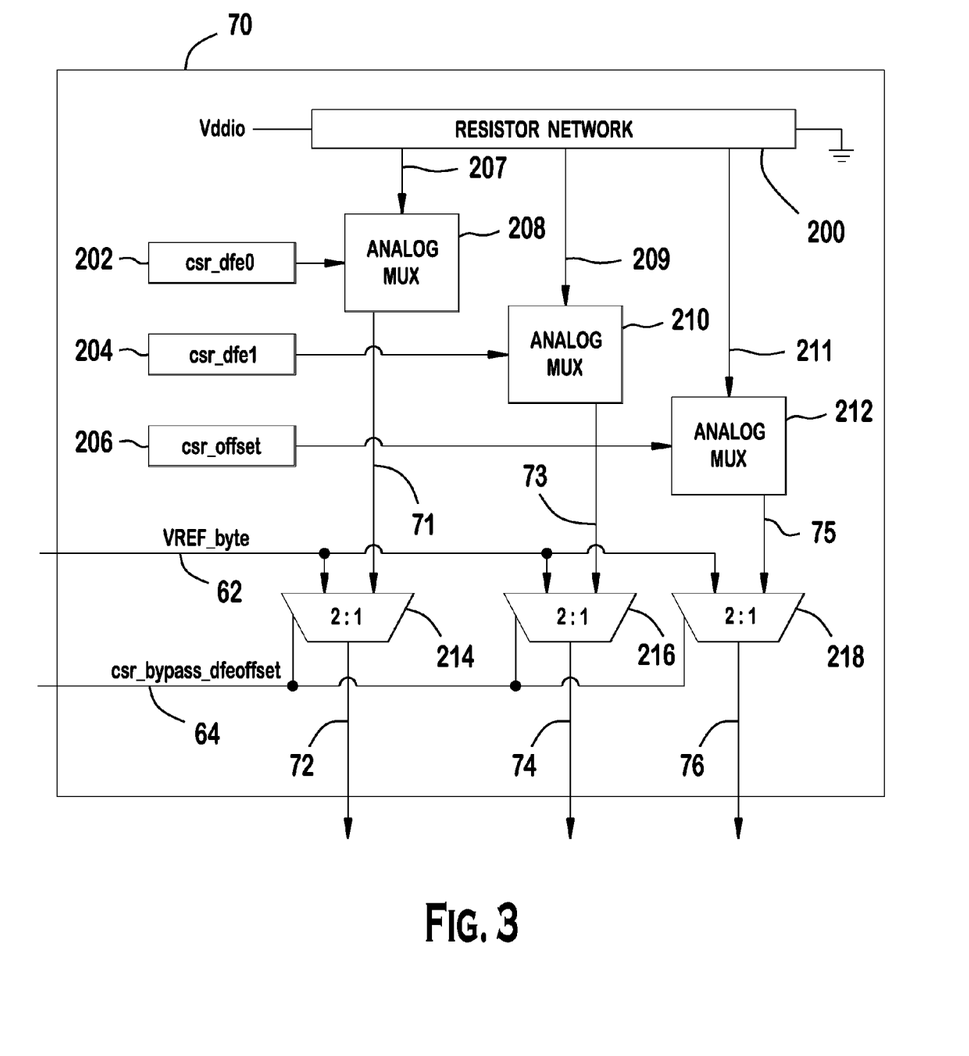
FIG. 3 is a block diagram of a threshold generator unit.

FIG. 3 is a block diagram of threshold generator unit 70. In this example, threshold generator unit 70 generally includes three programmable threshold voltage generators each having an output 71, 73 and 75. Each programmable threshold voltage generator shares a resistor network 200, (e.g., ladder network), and includes an analog multiplexer 208, 210, 212. Programmable location 202 stores the first threshold value csr_dfe0; programmable location 204 stores the second threshold value csr_dfe1; programmable storage location 206 stores the third threshold value csr_offset. It should be understood that programmable locations 202, 204, 206 may be located within the threshold generator unit 70 or elsewhere. For example, programmable locations 202, 204, 206 may be command and status registers as shown in FIG. 1.

The resistor network 200 includes a resistor ladder with one end coupled to the main memory supply voltage (Vddio) and the other end coupled to ground. Selecting the center resistor in the resistor ladder will yield one half of the main memory supply voltage (Vddio/2). Voltage reference 62 may also be derived from the main memory supply voltage (Vddio). In a typical case, the voltage reference 62 (VREF_byte) is set to half of the main memory supply voltage (Vddio/2) via voltage divider (not shown).

Analog multiplexers 208, 210, 212 select the desired resistor output from the resistor network 200 based on the threshold value stored in the associated programmable location 202, 204, 206. The resistor network 200 is configured to provide a range of voltages that correspond to the desired threshold value. For example, a six bit threshold value may numerically represent 0-63, (e.g., 64 discrete voltage levels). The 50% value is 32 or 0b100000. The analog multiplexer 208, 210, 212 and resistance network 200 are configured such that the center resistor is selected (Vddio/2) when the threshold value is set to the 50% value. Similarly, the analog multiplexer 208, 210, 212 and resistance network 200 are configured to provide a voltage level below or above Vddio/2 when the threshold value is below or above the 50% value respectively Threshold voltage generator 70 may also include a bypass pin 64 (csr_bypass_defeoffset). This pin is typically used in diagnostic operations. The bypass pin 64 is coupled to the select input of 2:1 multiplexers 214, 216, 218. When bypass pin 64 is enabled the voltage reference, (e.g., VREF_byte), is coupled to outputs 72, 74, 76 and DFE is disabled. When bypass pin 64 is disabled, threshold generator outputs 71, 73 and 75 are coupled to outputs 72, 74, 76.

Returning to FIG. 2, DFE receiver 40 also includes multiplexing logic 90 configured select one of the outputs 83, 85, 87 from the three differential amplifiers 82, 84, 86 as an input 81 to flip flop 80. The DFE receiver 40 selects the proper differential amplifier 82, 84 or 86 and in turn uses the desired threshold voltage for the next data bit at the Rxin pin 42. The DFE receiver 40 may select from three threshold voltages. The first or second threshold voltage is used depending on whether the prior data bit at the RxRcv pin 44 was a logic zero or a logic one. The third threshold voltage is used if the data bus was previously in a tri-state condition. A truth table for multiplexing logic 90 is illustrated by Table 1 below:

TABLE 1

| RxRcv (pin 44) | Rcvr_En (pin 92) | Next Bit Offset Selection | Diff Amp Selection | Sel 1 (pin 67) | Sel 2 (pin 87) |
|---|---|---|---|---|---|
| 0 | 0 | csr_dfe0 | 0 (pin 82) | 0 | 1 |
| 1 | 0 | csr_dfe1 | 1 (pin 84) | 1 | 1 |
| Tri-State | 1 | csr_offset | 2 (pin 86) | n/a | 0 |

A shown in Table 1, when the RxRcv pin 44 is a logic zero, output 83 of differential amplifier 82 is selected for the next data bit at the Rxin pin 42. This results in the selection of the csr_dfe0 threshold value for the next data bit at the Rxin pin 42. When the RxRcv pin 44 is a logic one, output 85 of differential amplifier 84 is selected for the next data bit at the Rxin pin 42. This results in selection of the csr_dfe1 threshold value. When the receive data bus is in a tri-state condition, the Rcvr_En signal (pin 92) is asserted and output 87 of differential amplifier 86 is selected for the next data bit at the Rxin pin 42. This results in the selection of the csr_offset threshold value for the next data bit at the Rxin pin 42.

Multiplexing logic 90 may include a DFE multiplexer 66 that drives select inputs 67 and 87 of first and second 2:1 analog multiplexers 68 and 88. In general, the Rcvr_En pin 92 is used to signal that the next data bit follows a tri-state condition. This allows selection of the third threshold, csr_offset by selecting the output 87 of differential amplifier 86 as the output 81 to flip flop 80. When Rcvr_En is asserted, the logic level at the select 1 input 67 is not applicable since the output of analog multiplexers 68 is not selected. DFE multiplexer 66 also controls selection of the first and second thresholds, csr_dfe0 and csr_dfe1 based on the RxRcv value as shown in Table 1.

Flip flop 80 includes a clock input 82. The clock input 82 is used to latch the D input pin 81. As discussed above, the D input pin 81 is driven by the selected differential amplifier, 82, 84 or 86 using the desired threshold voltage. Flip flop 80 outputs a digital data bit at the RcRcv pin 44. The RxRcv pin is fed back to the multiplexing logic 90 as discussed above.

In general, the Rcvr_En pin 92 is driven via memory controller delay locked loop (DLL) circuitry (not shown). It should be understood that the Rcvr_En pin 92 may be driven with an edge triggered or level triggered signal without departing from the scope of this disclosure. Such circuitry is used to set the timing for the read preamble. The RxClckX pin 94 is also driven via memory controller DLL circuitry.

Figure 4:
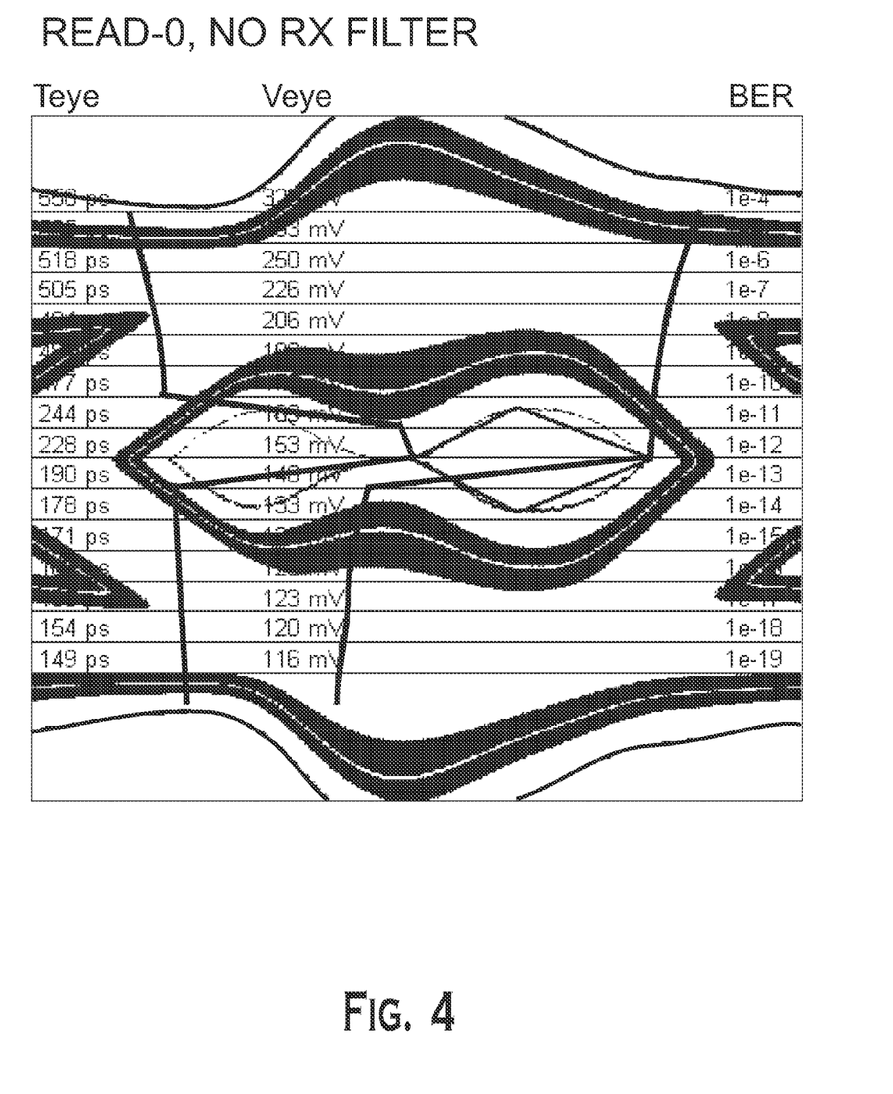
FIG. 4 is an eye diagram of a receiver system with high frequency noise present.
Figure 5:
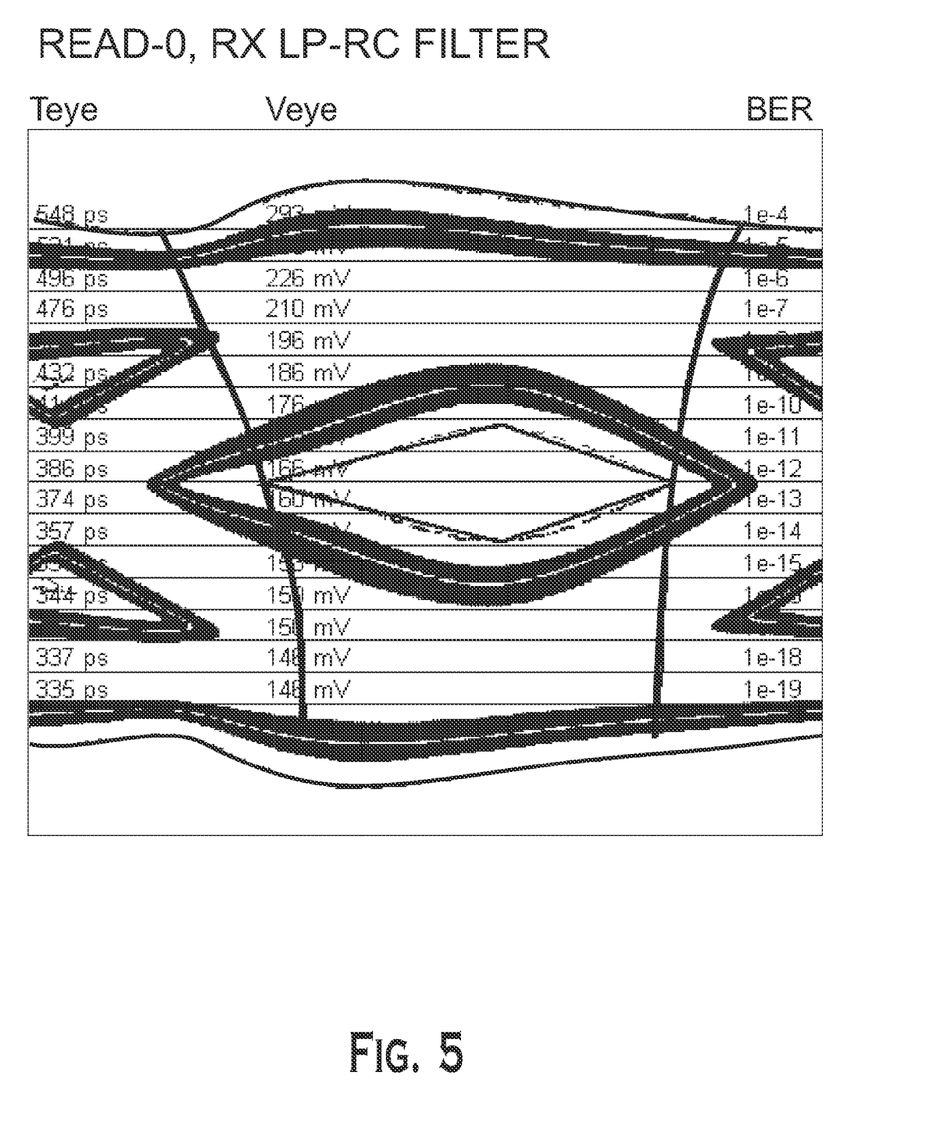
FIG. 5 is an eye diagram of a receiver system with a low pass filter and high frequency noise present.
Figure 6A:
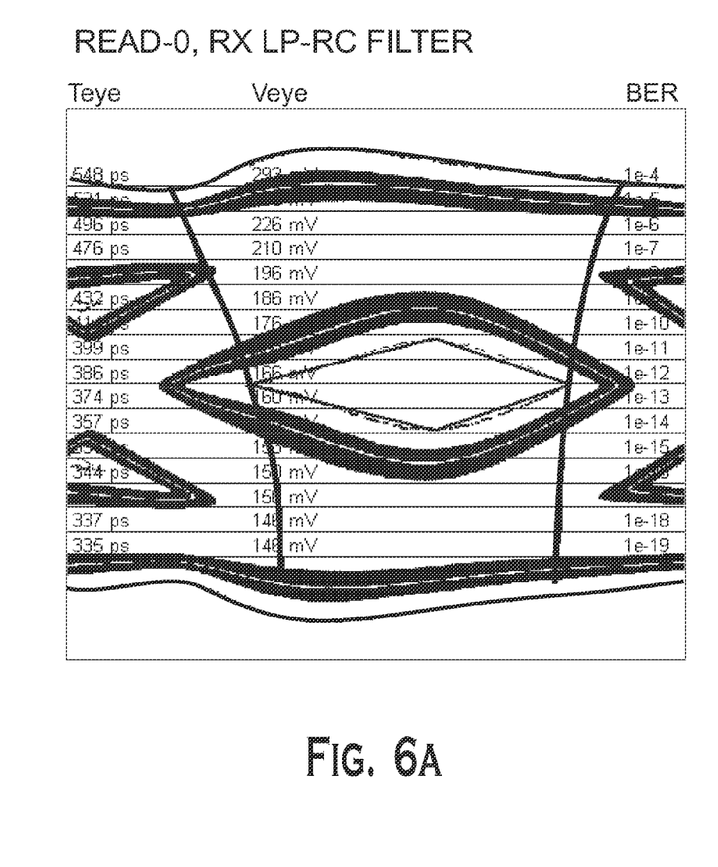
FIG. 6*a* is an eye diagram showing the use of a low pass filter without the improved DFE receiver.
Figure 6B:
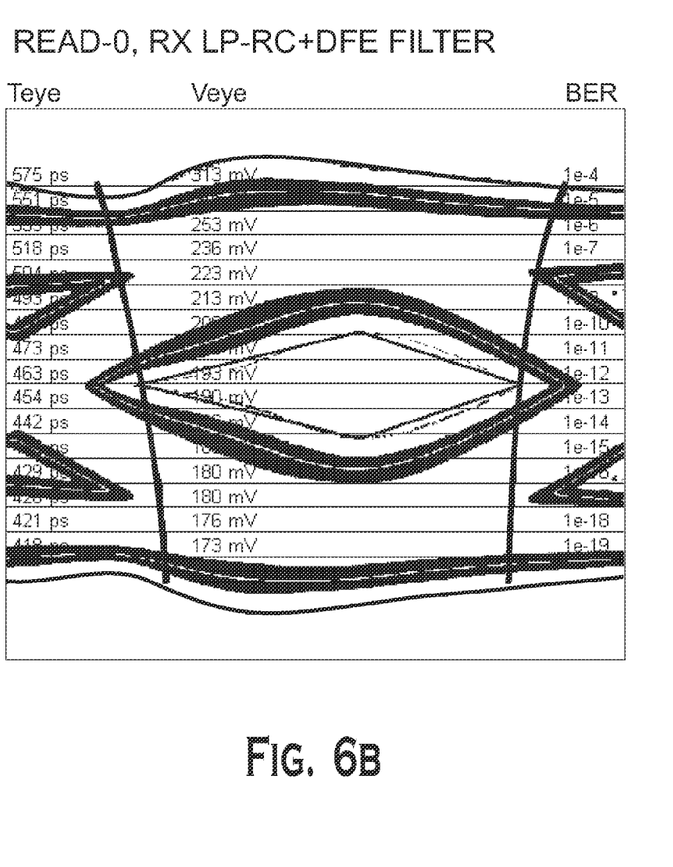
FIG. 6*b* is an eye diagram showing the use of a low pass filter with the improved DFE receiver.

DFE receiver 40 may also include a low pass filter circuit 100. A low pass filter may be used to remove high frequency noise such as a glitch on the Rxin pin 42. FIG. 4 shows an eye diagram with high frequency noise present. With high frequency noise present, the eye is almost closed and the probability of a read error is relatively high. FIG. 5 shows an eye diagram with a low pass filter present. With high frequency noise present and a low pass filter, the eye is open and the probability of a read error is greatly reduced. However, a low pass filter removes high frequency noise and some of the signal. This will result in a reduced eye height when compared to systems that do not use a low pass filter. The combination of an improved DFE receiver with a third voltage threshold and a low pass filter restores much of the eye height lost due to the low pass filter. FIGS. 6a and 6b show eye diagrams comparing the use of a low pass filter without and with the improved DFE receiver. FIG. 6b shows an eye height improvement of approximately 30 mV.

Figure 7:
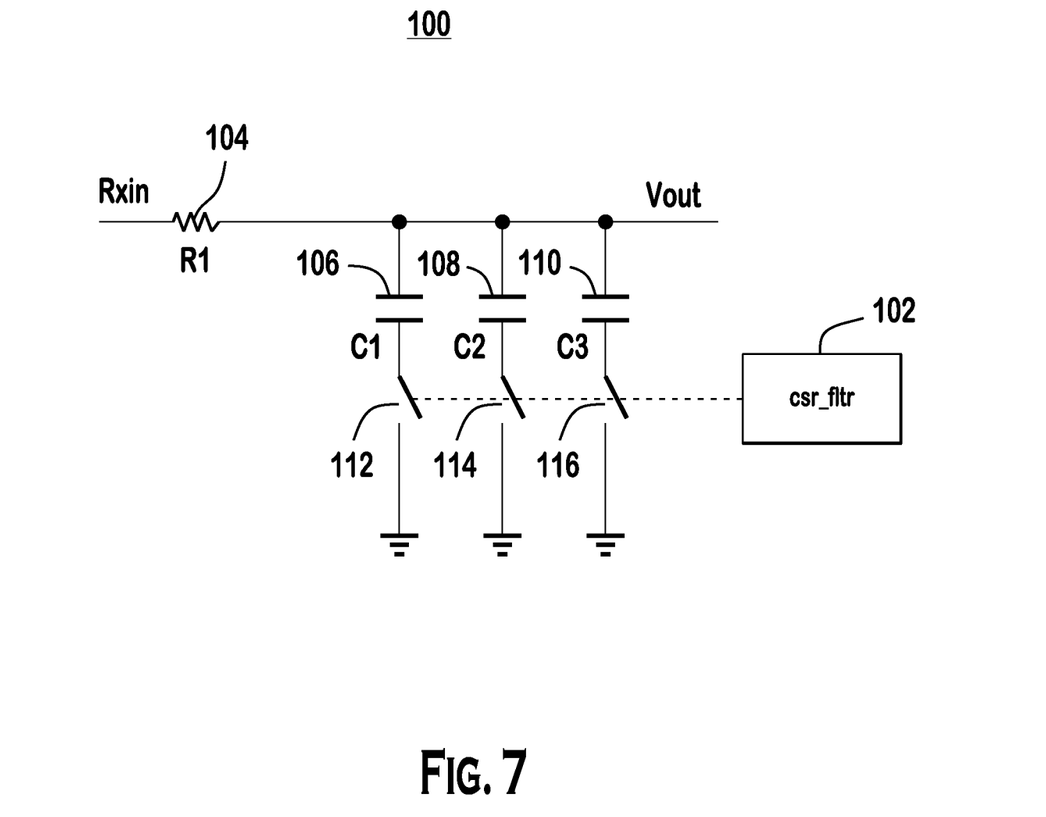
FIG. 7 is a block diagram of a low pass filter circuit.

FIG. 7 is a block diagram of a passive low pass filter 100. It should be understood that a wide variety of low pass filter designs may be used without departing from the scope of the invention including active and passive implementations. Low pass filter 100 includes an input resistor 104 and a plurality of capacitors 106, 108, 110. Capacitors 106, 108, 110 are selectable via switches/transistors 112, 114, 116. Programmable location 101 stores a multi-bit select input, csr_fltr 102. It should be understood that programmable location 101 may be located within the low pass filter 100 or elsewhere. For example, programmable location 101 may be a command and status register as shown in FIG. 1.

In this example, csr_fltr 102 has three bits (eight possible values). The value stored in csr_fltr 102 is coupled to switches/transistors 112, 114, 116 and selectively controls the capacitance value for the low pass filter 100. This allows the csr_fltr input 102 to control the cut off frequency of low pass filter 100.

Figure 8:
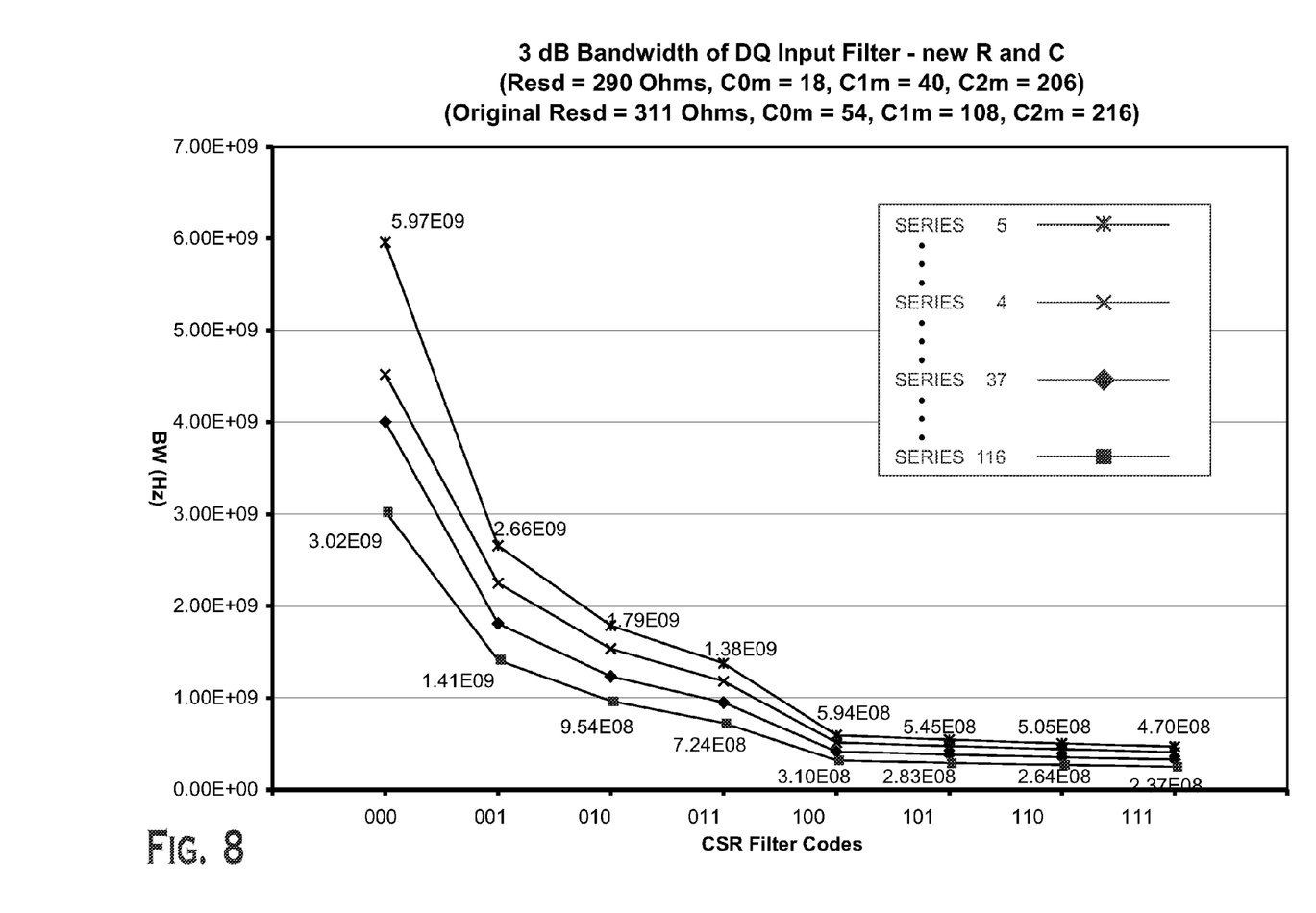
FIG. 8 is a graph showing low pass filter 100 bandwidth as a function of the input program code for various process/voltage/temp corners of interest.

FIG. 8 is a graph showing low pass filter 100 bandwidth as a function of the input program code (csr_fltr) for various process/voltage/temp corners of interest. In this example, the R and C values are chosen such that the low pass filter 100 may selectively limit the bandwidth from 3 GHz down to about 237 MHz.

Although features and elements are described above in particular combinations, each feature or element may be used alone without the other features and elements or in various combinations with or without other features and elements. The apparatus described herein may be manufactured by using a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Embodiments of the present invention may be represented as instructions and data stored in a computer-readable storage medium. For example, aspects of the present invention may be implemented using Verilog, which is a hardware description language (HDL). When processed, Verilog data instructions may generate other intermediary data (e.g., netlists, GDS data, or the like) that may be used to perform a manufacturing process implemented in a semiconductor fabrication facility. The manufacturing process may be adapted to manufacture semiconductor devices (e.g., processors) that embody various aspects of the present invention.

Suitable processors include, by way of example, a general purpose processor, a special purpose processor, a conventional processor, a digital signal processor (DSP), a plurality of microprocessors, a graphics processing unit (GPU), a DSP core, a controller, a microcontroller, application specific integrated circuits (ASICs), field programmable gate arrays (FPGAs), any other type of integrated circuit (IC), and/or a state machine, or combinations thereof.

What is claimed is:
1. A decision feedback equalization (DFE) receiver configured to sample data bits from a data bus, the DFE receiver comprising:
a data sampler configured to sample a current data bit from the data bus using one of a first, second and third voltage reference; and
multiplexing logic configured to select one of the first, second and third voltage references based on a prior data bus level, wherein the first voltage reference is selected if the prior data bus level was a logic zero, the second voltage reference is selected if the prior data bus level was a logic one, and the third voltage reference is selected if the prior data bus level was tri-state.

2. The DFE receiver of claim 1 further comprising a first programmable location configured to store a first threshold value associated with the first threshold voltage, a second programmable location configured to store a second threshold value associated with the second threshold voltage and a third programmable location configured to store a third threshold value associated with the third threshold voltage.

3. The DFE receiver of claim 2 further comprising a first threshold voltage generator configured generate the first threshold voltage based on the first threshold value, a second threshold voltage generator configured generate the second threshold voltage based on the second threshold value, and a third threshold voltage generator configured generate the third threshold voltage based on the third threshold value.

4. The DFE receiver of claim 1 wherein the multiplexing logic comprises an enable input configured to receive a tri-state enable indication identifying whether the data bus level was tri-state.

5. The DFE receiver of claim 1 wherein the data sampler includes a first amplifier configured to sample data using the first threshold, a second amplifier configured to sample data using the second threshold voltage and a third amplifier configured to sample data using the third threshold voltage.

6. The DFE receiver of claim 5 wherein the data sampler includes a flip flop having a sense amplifier input configured to selectively latch data output from the first, second and third amplifiers.

7. The DFE receiver of claim 5 wherein the multiplexing logic is configured to select data output from one of the first, second and third amplifiers based on the selected voltage reference.

8. The DFE receiver of claim 1 further comprising a low pass filter configured to filter data bits from the data bus.

9. The DFE receiver of claim 8 wherein the low pass filter includes a programmable location configured to store a select input and the low pass filter includes an adjustable cut-off frequency responsive to the select input.

10. A method of providing decision feedback equalization (DFE) in a receiver configured to sample data bits from a data bus, the method comprising:
provideing a data sampler configured to sample a current data bit from the data bus using one of a first, second and third voltage reference; and
selecting one of the first, second and third voltage references based on a prior data bus level, wherein the first voltage reference is selected if the prior data bus level was a logic zero, the second voltage reference is selected if the prior data bus level was a logic one, and the third voltage reference is selected if the prior data bus level was tri-state.

11. The method of claim 10 further comprising storing a first threshold value associated with the first threshold voltage, a second threshold value associated with the second threshold voltage and a third threshold value associated with the third threshold voltage.

12. The method of claim 10 further comprising generating the first threshold voltage based on the first threshold value, generating the second threshold voltage based on the second threshold value, and generating the third threshold voltage based on the third threshold value.

13. The method of claim 10 further comprising providing an enable input configured to receive a tri-state enable indication configured to indicate that the data bus was previously in a tri-state condition.

14. The method of claim 10 wherein the data sampler includes a first amplifier configured to sample data using the first threshold, a second amplifier configured to sample data using the second threshold voltage and a third amplifier configured to sample data using the third threshold voltage.

15. The method of claim 14 wherein the data sampler includes a flip flop having a sense amplifier input configured to selectively latch data output from the first, second and third amplifiers.

16. The method of claim 14 further comprising selecting data output from one of the first, second and third amplifiers based on the selected voltage reference.

17. The method of claim 10 further comprising low pass filtering data bits from the data bus.

18. The method of claim 17 further comprising adjusting a cut-off frequency for the low pass filtering based on a select input stored at a programmable location.

19. A non-transitory computer readable media comprising hardware design code stored thereon, and when processed by a processor generates other intermediary data to create mask works for a receiver that is configured to sample data bits from a data bus by performing actions comprising:
providing a data sampler configured to sample a current data bit from the data bus using one of a first, second and third voltage reference; and
selecting one of the first, second and third voltage references based on a prior data bus level, wherein the first voltage reference is selected if the prior data bus level was a logic zero, the second voltage reference is selected if the prior data bus level was a logic one, and the third voltage reference is selected if the prior data bus level was tri-state.

20. The media of claim 19 further comprising storing a first threshold value associated with the first threshold voltage, a second threshold value associated with the second threshold voltage and a third threshold value associated with the third threshold voltage.

21. The media of claim 19 further comprising generating the first threshold voltage based on the first threshold value, generating the second threshold voltage based on the second threshold value, and generating the third threshold voltage based on the third threshold value.

22. The media of claim 19 further comprising providing an enable input configured to receive a tri-state enable indication configured to indicate that the data bus was previously in a tri-state condition.

23. The media of claim 19 wherein the data sampler includes a first amplifier configured to sample data using the first threshold, a second amplifier configured to sample data using the second threshold voltage and a third amplifier configured to sample data using the third threshold voltage.

24. The media of claim 23 wherein the data sampler includes a flip flop having a sense amplifier input configured to selectively latch data output from the first, second and third amplifiers.

25. The media of claim 23 further comprising selecting data output from one of the first, second and third amplifiers based on the selected voltage reference.

26. The media of claim 19 further comprising low pass filtering data bits from the data bus.

27. The media of claim 26 further comprising adjusting a cut-off frequency for the low pass filtering based on a select input stored at a programmable location.

* * * * *